United States Patent
Hsu

[11] Patent Number: 5,819,469
[45] Date of Patent: Oct. 13, 1998

[54] SUPPORT PLATE FOR FLOWER-POTS THAT PREVENTS OVERFLOW AND INHIBITS MOSQUITO PROPAGATION

[76] Inventor: Che-Kuo Hsu, No. 11, Chu Kuang 1 st. Ta Fa Industiral Park.Ta Liao Hsiang, Kao Hsiung Hsien, Taiwan

[21] Appl. No.: 710,922

[22] Filed: Sep. 24, 1996

[51] Int. Cl.[6] .................................................. A47G 7/00
[52] U.S. Cl. ........................................... 47/39; 47/71
[58] Field of Search ............................................ 47/39, 71

[56] References Cited

U.S. PATENT DOCUMENTS

| | | | |
|---|---|---|---|
| 4,638,595 | 1/1987 | Rivero | 47/39 |
| 5,152,098 | 10/1992 | Hall | 47/39 |
| 5,341,596 | 8/1994 | Kao | 47/71 |
| 5,430,973 | 7/1995 | Luo | 47/71 |
| 5,581,937 | 12/1996 | Jenkins | 47/71 |

FOREIGN PATENT DOCUMENTS

| | | | |
|---|---|---|---|
| 233181 | 1/1960 | Australia | 47/71 |
| 465067 | 8/1951 | Italy | 47/71 |
| 85855 | 5/1955 | Norway | 47/71 |
| 754597 | 8/1956 | United Kingdom | 47/71 |

*Primary Examiner*—Michael J. Carone
*Assistant Examiner*—Joanne C. Downs
*Attorney, Agent, or Firm*—Pro-Techtor International Services

[57] ABSTRACT

A support plate for flower pots in which water is stored and hidden in an open space between an upper plate element and a lower plate element. If too much water accumulates, a drain hole provided in a lower side of an annular peripheral wall surrounding the upper and lower plate elements can be opened by removing a removable stop so as to drain water accumulated in an open space.

2 Claims, 3 Drawing Sheets

SUPPORT PLATE FOR FLOWER-POTS THAT PREVENTS OVERFLOW AND INHIBITS MOSQUITO PROPAGATION

BACKGROUND OF THE INVENTION

This invention concerns a support plate for a flower pot, particularly a plate able to receive water flowing out of the flower pot, wither rain water of water that is applied. The plate eliminates excess accumulation of water in an open space between an upper plate element and a lower plate element of the plate to prevent mosquitos from laying eggs therein.

Most support plates for flower pots used indoors or on balconies of houses or apartments have drawbacks as listed below:

1. Water flowing out of a flower pot remains on the support plate, permitting mosquitos to lay eggs therein.
2. When water remaining in a flower pot has to be emptied, the pot is not easy to handle if the pot is heavy.
3. A flower pot is not easy to move if it is heavy.

For example, Taiwan patent No. 14669 (Application No. 57607) titled "Draining and Movable Support Plate for Flower Pots" has rollers for moving the pot, and a drain hole for water to flow out.

Taiwan patent No. 36548 (Application No. 75207687) titled "Movable Support Plate for Flower Pots" has four rollers for moving the pot and a recessed groove in the bottom so as to keep the ground clean.

Taiwan patent No. 51205 (Application No. 77207821) titled "Double Support Plate for Flower Pots" has an upper plate and a lower plate screwed together. The upper plate has to be loosened to remove the flower pot.

Taiwan patent No. 81893 (Application No. 81206379) titled "Water Collecting Plate for Flower Pots" has a water recess formed in the center of a bottom to collect water flowing out of flower pots placed on the plate. The flower pots have to be removed from the plate for cleaning.

Taiwan patent No. 107237 (Application No. 83214031) titled "Water Collecting Plate for Flower Pots" has a water plate formed integrally with a bottom. The water plate has a recess, and another drawer-shaped water plate is provided under the recess. The recess has a drain hole for water to flow through onto the drawer-shaped water plate, which may be pulled out easily to empty water accumulated therein. However, if too much water is collected in the drawer-shaped water plate, it may overflow out of the plate onto the ground.

The preceding examples, except No. 107237, all have a structure wherein water flowing out of flower pots may collect on a support plate so that mosquitos can easily lay eggs to propagate quickly. The structures of the plates are rather complicated, and the plates are hard to clean.

SUMMARY OF THE INVENTION

This invention has been devised to offer a support plate for flower pots in which water is stored and hidden in an open space between an upper plate element and a lower plate element. If too much water accumulates, a drain hole provided in a lower side of an annular peripheral wall surrounding the upper and lower plate elements can be opened by removing a removable stop so as to drain water accumulated in an open space.

BRIEF DESCRIPTION OF THE DRAWINGS

This invention will be better understood by reference to the accompanying drawings, wherein.

DESCRIPTION OF THE PREFERRED EMBODIMENT

Figure 2:
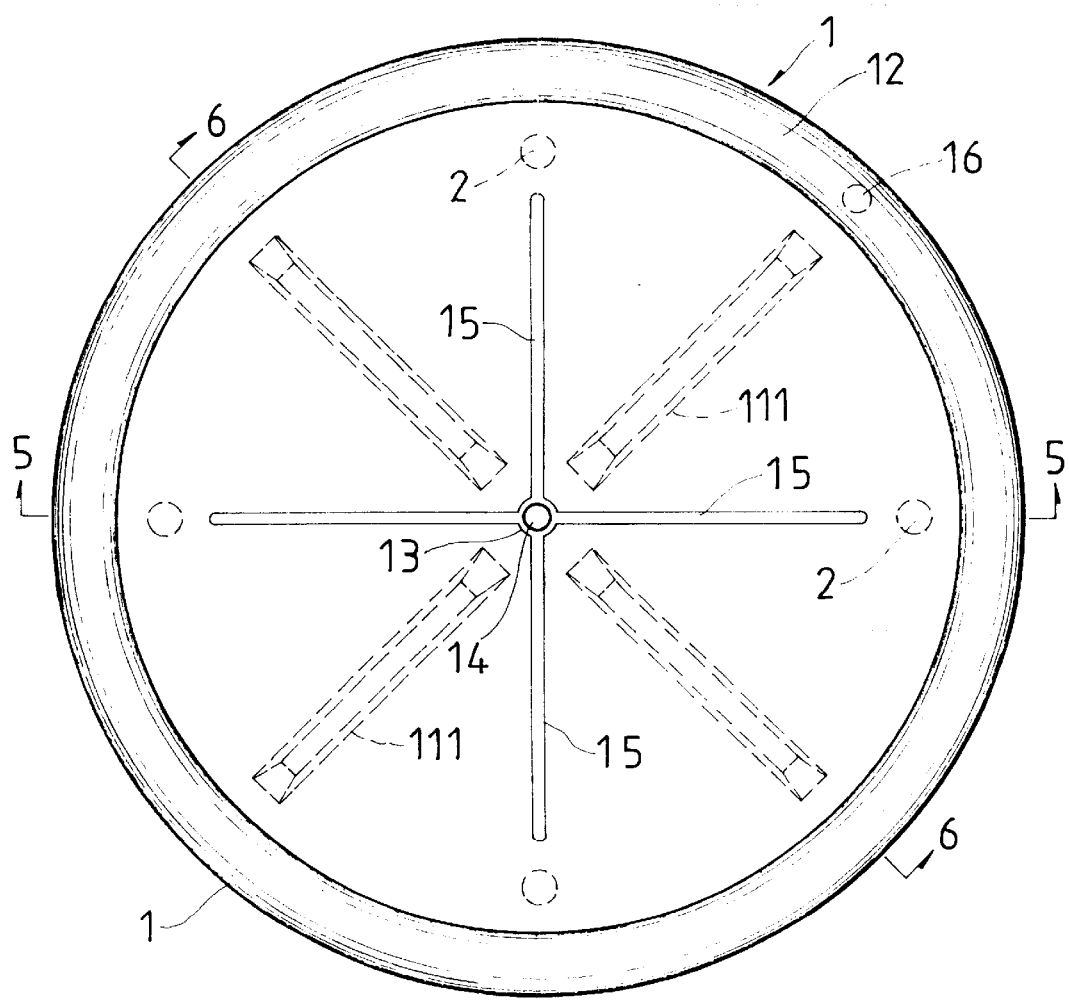
FIG. 2 is a top view of the support plate.
Figure 1:
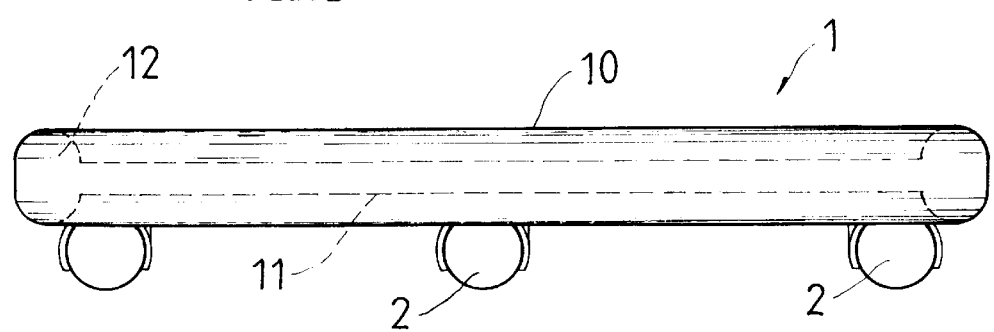
FIG. 1 is a front view of the support plate for flower pots of the present invention.
Figure 4:
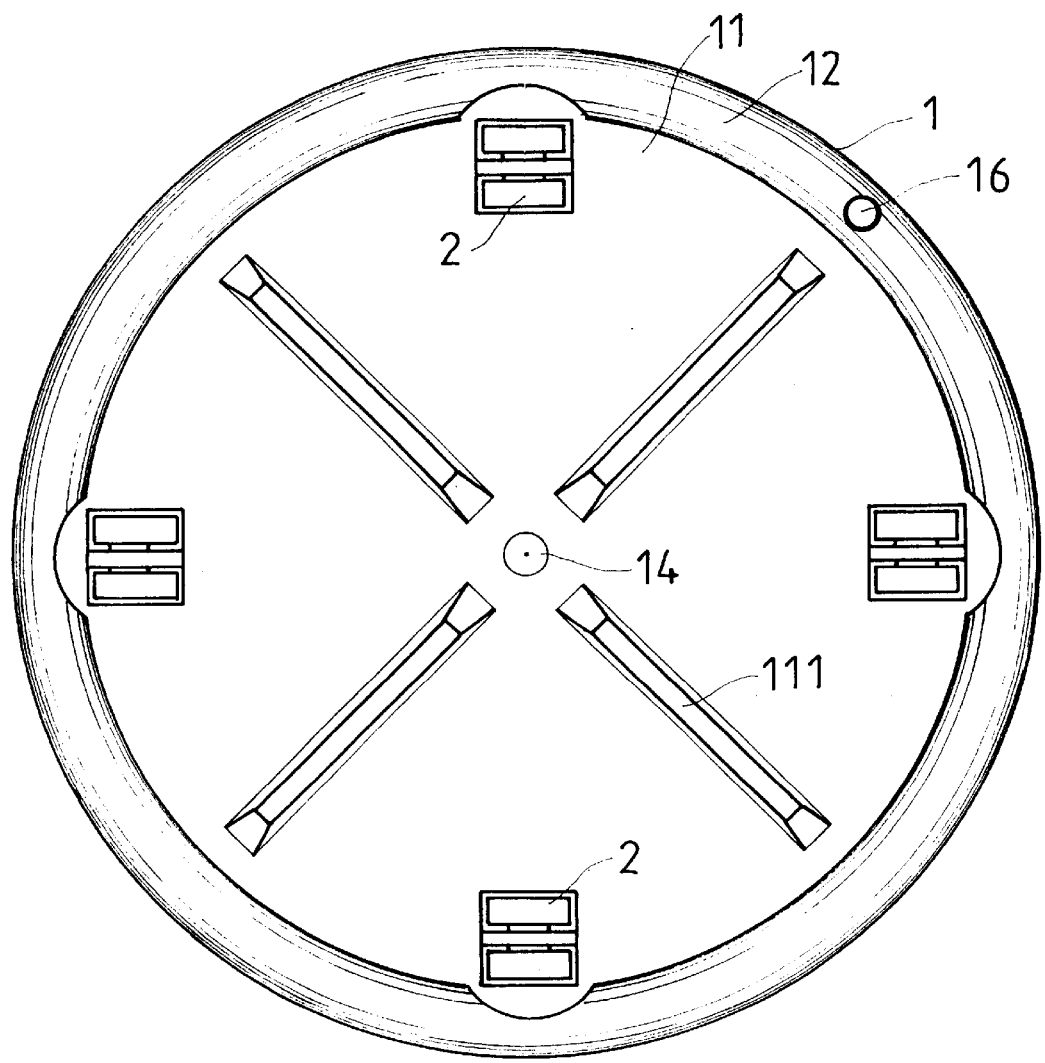
FIG. 4 is a bottom view of the support plate.
Figure 3:
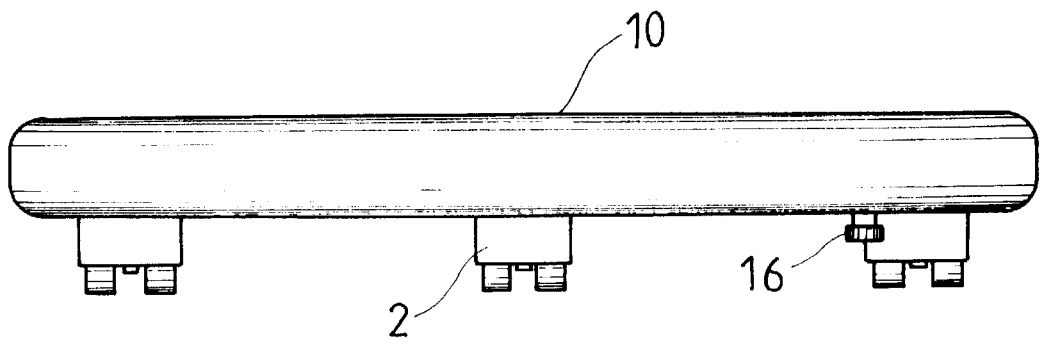
FIG. 3 is a side view of the support plate.

A preferred embodiment of a support plate 1 for flower pots according to the present invention, as shown in FIGS. 1–6, has an upper plate element 10 and a lower plate element 11. The upper plate element 10 has a water hole 13 in the center. One or more water guiding grooves 15 leading to the water hole 13 causes water flowing out of the water pot to flow along the grooves 15 and down through the water hole 13 onto the lower plate element 11, where the water is received in an open space 17.

The lower plate element 11 is formed with a plurality of ridges 111 extending in radial directions and supporting the upper plate element 10. A cone 14 is included on an upper surface of the lower plate element 11. When water flows down through the water hole 13, the sound muffling cone 14 reduces the sound made by the water.

The hollow annular periphery wall 12 has its upper edge extending above the upper plate element 10 so that a flower pot may be securely placed within the wall 12. The open space 17 between the upper plate element 10 and the lower plate element 11 is in communication with the hollow interior of the annular peripheral wall 12.

Further, a drain hole 16 is formed in a lower side of the annular peripheral wall 12. The drain 16 is normally closed with a stop. The stop is removable to drain water from the open space 17 in case the water level in the open space 17 of the support plate 1 is too high and begins to overflow upward through the hole 13.

Wheels or rollers 2 may be affixed under the bottom of the plate 1 so as to easily move the flower pot together with the support plate 1. The wheels or rollers 2 are well known art, and are therefore not described in detail. Feet may be used instead of wheels or rollers 2, having a height that allows convenient draining of water from the drain hole 16.

Figure 5:
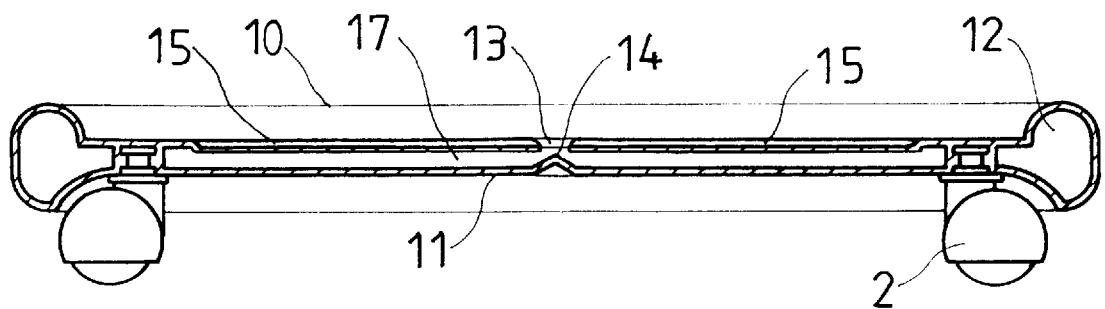
FIG. 5 is a cross-sectional view along line 5—5 in FIG. 2.

Referring specifically to FIG. 5, if there is too much water in a flower pot placed on the support plate 1 of the present invention, water will flow through the bottom of the flower pot onto the upper plate element 10. The water then flows through the water hole 13 into the open space 17. The water makes little sound due to the sound muffling cone 14. When water comes from other sources, such as rain or a sprinkling can, it falls into the support plate 1, and will flow along the guide groove(s) 15 to the hole 13. The water flows through the hole 13 into the open space 17. In this manner, water does not collect on the upper plate element 10. This prevents mosquitos from laying eggs in the water and thus protects the environment around houses.

Figure 6:
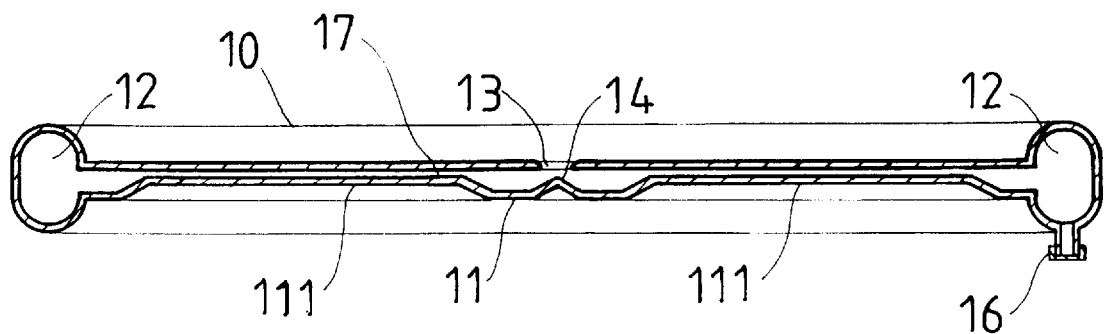
FIG. 6 is a cross-sectional view along line 6—6 in FIG. 2.

Now referring specifically to FIG. 6, if water fills up the open space 17 of the support plate 1 so that it begins to overflow upward through the hole 13 in the upper plate element 10, the water may be drained out of the drain hole 16 easily by temporarily removing the stop from the drain hole 16.

As can be seen from the above description, this invention has the following advantages:

1. It can retain a proper quantity of water in the open space, preventing mosquitos from laying eggs, and thus maintain good hygiene and a pleasant environment.

2. It is easy to clean if necessary.

3. Water never overflows, keeping flower pots clean.

While the preferred embodiment of the invention has been described above, it will be recognized and understood that various modifications may be made therein and the appended claims are intended to cover all such modifications which may fall within the spirit and scope of the invention.

What is claimed is:

1. A support plate for flower pots comprising:

an upper plate element and a lower plate element, with an open space defined between said upper plate element and said lower plate element, a plurality of support means provided on a lower surface of said lower plate element, a water hole provided in a central portion of said upper plate element such that water passes through said water hole into said open space, an annular peripheral wall formed integral to said upper plate element and said lower plate element such that said wall, said upper plate element, and said lower plate element form an integral unit, an upper edge of said peripheral wall extending above a top surface of said upper plate element, a drain hole formed in a lower side of said peripheral wall, said drain hole including a removable stop, said lower plate element including on an upper surface thereof at least one ridge that supports said upper plate element, and said upper plate element including at least one water guide groove leading to said water hole.

2. A support plate for flower pots comprising:

an upper plate element and a lower plate element, with an open space defined between said upper plate element and said lower plate element, a plurality of support means provided on a lower surface of said lower plate element, a water hole provided in a central portion of said upper plate element such that water passes through said water hole into said open space, an annular peripheral wall formed integral to said upper plate element and said lower plate element such that said wall, said upper plate element, and said lower plate element form an integral unit, an upper edge of said peripheral wall extending above a top surface of said upper plate element, a drain hole formed in a lower side of said peripheral wall, said drain hole including a removable stop, said lower plate element including on an upper surface thereof at least one ridge that supports said upper plate element, and said lower plate element further including a protrusion extending upward from an upper surface thereof, said protrusion being aligned with said water hole in said upper plate element.

* * * * *